US010364168B2

(12) United States Patent
Canicio Bardolet et al.

(10) Patent No.: US 10,364,168 B2
(45) Date of Patent: Jul. 30, 2019

(54) WATER SYNCHRONIC ELECTRODENITRIFICATION PROCESS

(71) Applicant: Hydrokemós, S.L., Torelló-Barcelona (ES)

(72) Inventors: Ruth Canicio Bardolet, Torelló-Barcelona (ES); Olga Onuki Esteban, Torelló-Barcelona (ES); José Alfonso Canicio Chimeno, Torelló-Barcelona (ES)

(73) Assignee: Hydrokemós, S.L. (ES)

( * ) Notice: Subject to any disclaimer, the term of this patent is extended or adjusted under 35 U.S.C. 154(b) by 0 days.

(21) Appl. No.: 15/570,099

(22) PCT Filed: Apr. 29, 2016

(86) PCT No.: PCT/EP2016/059584
§ 371 (c)(1),
(2) Date: Oct. 27, 2017

(87) PCT Pub. No.: WO2016/174189
PCT Pub. Date: Nov. 3, 2016

(65) Prior Publication Data
US 2018/0141835 A1    May 24, 2018

(30) Foreign Application Priority Data
Apr. 30, 2015    (EP) .................................... 15382218

(51) Int. Cl.
*C02F 1/46*    (2006.01)
*C02F 1/461*    (2006.01)
(Continued)

(52) U.S. Cl.
CPC .......... *C02F 1/46104* (2013.01); *C02F 1/008* (2013.01); *C02F 1/4676* (2013.01);
(Continued)

(58) Field of Classification Search
CPC ................ C02F 1/46104; C02F 1/4676; C02F 2001/46157; C02F 2101/163;
(Continued)

(56) References Cited

U.S. PATENT DOCUMENTS

2009/0014337 A1* 1/2009 Clarke ...................... C02F 1/42
                                                    205/760
2014/0183054 A1* 7/2014 Legzdins ................ C02F 1/461
                                                    205/343

FOREIGN PATENT DOCUMENTS

ES    2400506 A2    4/2013

OTHER PUBLICATIONS

Brunauer, S, Emmett, P. H. and Teller, E., Adsorption of gases in multimolecular layers, J. Am. Chem. Soc., Feb. 1938, 60, 309.
(Continued)

*Primary Examiner* — Arun S Phasge
(74) *Attorney, Agent, or Firm* — Lerner, David, Littenberg, Krumholz & Mentlik, LLP (57) ABSTRACT

The present invention relates to a water purification process carried out in an electrochemical cell in which the content of nitrate ions of an aqueous solution is reduced providing a resulting aqueous solution having a concentration of nitrate concentration lower than 100 ppm, an ammonium concentration lower than 50 ppm and a combined chlorine concentration lower than 2 ppm. The invention also provides a method for designing an electrochemical cell suitable for carrying out said water purification process.

15 Claims, 3 Drawing Sheets

(51) Int. Cl.
    *C02F 1/00*         (2006.01)
    *C02F 1/467*      (2006.01)
    *C02F 101/16*     (2006.01)

(52) U.S. Cl.
    CPC ............... *C02F 2001/46138* (2013.01); *C02F 2001/46152* (2013.01); *C02F 2001/46157* (2013.01); *C02F 2101/16* (2013.01); *C02F 2101/163* (2013.01); *C02F 2201/4611* (2013.01); *C02F 2201/4614* (2013.01); *C02F 2209/14* (2013.01); *C02F 2209/15* (2013.01)

(58) Field of Classification Search
    CPC .............. C02F 2209/15; C02F 2209/14; C02F 2001/46152; C02F 2001/46138; C02F 2201/4614; C02F 2201/4611; C02F 2101/16; C02F 1/008
    See application file for complete search history.

(56) References Cited

OTHER PUBLICATIONS

Designers, Specifiers and Buyers Handbook for Perforated Metals. Industrial Perforators Association (IPA), Washington, Jan. 1993, p. 49, with cover and last page 3 pages total.

International Search Report from PCT/EP2016/059584 dated Jun. 28, 2016.

Li, M., et.al., Optimization of process parameters for electrochemical nitrate removal using Box-Behnken design, Electrochimica Acta, vol. 56 No. 1, Sep. 2010, 265-270, Elsevier.

Sim, Joohyun, et.al., Electrochemical denitrification of metal-finishing wastewater: Influence of operational parameters, Korean Journal of Chemical Engineering, Dec. 27, 2011, vol. 29, No. 4 pp. 483-488, Springer US, Boston.

\* cited by examiner

WATER SYNCHRONIC ELECTRODENITRIFICATION PROCESS

CROSS-REFERENCE TO RELATED APPLICATIONS

The present application is a national phase entry under 35 U.S.C. § 371 of International Application No. PCT/EP2016/059584 filed Apr. 29, 2016, published in English, which claims priority from EP 15382218.4 filed Apr. 30, 2015, all of which are incorporated by reference.

FIELD OF THE INVENTION

The present invention relates to a water purification process carried out in an electrochemical cell in which the content of nitrate ions of an aqueous solution is reduced providing a resulting aqueous solution having a concentration of nitrate concentration lower than 100 ppm, an ammonium concentration lower than 50 ppm and a combined chlorine concentration lower than 2 ppm. The invention also provides a method for designing an electrochemical cell suitable for carrying out said water purification process.

BACKGROUND OF THE INVENTION

Nitrate ($NO_3^-$) can reach both surface water and groundwater as a consequence of agricultural activity (including excess application of inorganic nitrogenous fertilizers and manures), from domestic and industrial wastewater disposal and from oxidation of nitrogenous waste products in human and animal excreta, including septic tanks. Some groundwaters may also have nitrate contamination as a consequence of leaching from natural vegetation. Nitrate levels in excess of 50 ppm in drinking water have been linked to health problems such as methaemoglobinaemia, in particular in infants, as well as gastric cancers.

Several processes are known for removing nitrates from water, such as, ion exchange, reverse osmosis and biological denitrification. In ion exchange processes water is passed through a column containing an anion exchange resin. When this resin is fully loaded with nitrate ions, the resin is regenerated by exchanging with a solution containing a different ion and the resulting nitrate solution needs to be discharged as a waste. In reverse osmosis, the water is passed through a membrane that retains nitrate ions. The resultant concentrated solution of retained ions must then be discarded. Biological denitrification involves the use of bacteria, which are problematic since their capability of removing the nitrogen-containing components is temperature-dependent.

Thus, the drawbacks of these processes is that produce relatively concentrated nitrate solutions which need to be discharged, that they are temperature dependent and that they lead to significant costs.

Electrochemical processes for removing nitrates (i.e. electrodenitrification) from water have also been described in the prior art, such as in patent application ES 2 400 506 A2. In these processes a nitrate ion reducing reaction to ammonia and nitrogen gas occurs at a cathode and, at an anode, chloride ions present in the water are oxidized to hypochlorite. In these processes a nitrate ion reducing reaction to ammonia and nitrogen gas occurs at a cathode, chloride ions present in the water are oxidized to hypochlorite at an anode, chlorine dissociates in water into hypochlorite and chloride, and said hypochlorite reacts with ammonia to produce nitrogen gas, according to the reactions shown below.

$NO_3^- + 6H_2O + 8e^- \rightarrow NH_3 + 9OH^-$

$NO_3^- + 3H_2O + 5e^- \rightarrow \frac{1}{2}N_2 + 6OH^-$ $2Cl^- \rightarrow Cl_2 + 2e^-$ $Cl_2 + H_2O \rightarrow HClO + HCl$ $2NH_3 + 3HClO \rightarrow N_2 + 3HCl + 3H_2O$ Levels of ammonium and chlorine derivatives present in drinking water may not exceed certain values, 0.5 ppm and 2 ppm, respectively. In order to simultaneously obtain acceptable nitrate, ammonium and chlorine levels using an electrodenitrification process, the time needed for the reduction of nitrate concentration to the desired level must be the same as that for complete oxidation of ammonium to nitrogen gas. Otherwise, ammonium will remain in the water or chloramine compounds will appear by reaction of free chlorine in excess with remaining ammonium. A similar situation occurs for water discarded into public wastewater systems, wherein levels of ammonium may not exceed certain values, generally of 50 ppm. In this case, in order to simultaneously obtain acceptable nitrate and ammonium levels using an electrodenitrification process, the time needed for the reduction of nitrate concentration to the desired level must be the same as that for oxidation of ammonium to nitrogen gas until the desired level of ammonium is reached.

Patent application ES 2400506 A2, discloses an electrochemical cell for electrodenitrificating water wherein acceptable nitrate, ammonium and chlorine levels are obtained. However, said patent application only provides 2 examples in which the nitrate content in the water to be treated is 125 ppm and 123 ppm at about 200 ppm of chloride concentration. However, this patent application does not provide any information regarding the fractal surface of the cathode and the inert surface of the anode. The inventors have observed, that these parameters influence the overall design of electrochemical cells suitable for achieving acceptable ammonium, combined chlorine and nitrate levels, as shown in the in the comparative examples of the present application.

Therefore, there is still a need to provide a process for treating water whereby acceptable nitrate, ammonium and chlorine levels are simultaneously obtained.

SUMMARY OF THE INVENTION

The inventors have surprisingly found a process for water treatment in an electrochemical cell having specific design parameters whereby the target acceptable nitrate, ammonium and chlorine levels can be simultaneously obtained. This process can be used both for obtaining drinking water and for pretreating the water to be discarded into public wastewater systems so that it complies with the specifications fixed by public authorities. Moreover, the inventors have also found a method for determining the design parameters of an electrochemical cell suitable for carrying out the water treatment process of the present invention.

Thus, in a first aspect, the present invention relates to a method for designing an electrochemical cell suitable for reducing the initial nitrate concentration ($C_0$) of a first aqueous solution having a nitrate concentration ($C_0$) greater than 5 ppm and a chloride concentration from 25 ppm to 1500 ppm to yield a second aqueous solution having a final nitrate concentration ($C_f$) lower than 100 ppm, an ammonium concentration $[NH_4^+]_f$ lower than 50 ppm and a combined chlorine concentration lower than 2 ppm, by selecting the volume, the cathode and the anode of said cell as well as selecting the electrical intensity in amperes per volume unit to be applied when operating said cell, said method comprises the following steps:

a) calculating the parameter Z using formula (1):

$$Z = \frac{-\ln(C_f/C_0)}{C_0 - C_f - [NH_4^+]_f} \quad (1)$$

wherein the initial nitrate concentration ($C_0$) of the first aqueous solution, the final nitrate concentration ($C_f$) and the final ammonium concentration ($[NH_4^+]_f$) of the second aqueous solution are expressed in mmol/liter;

b) fixing the production (P) in liters/minute of the electrochemical cell, defined as the volume per minute of first aqueous solution that it is desired that the cell is capable of treating;

c) calculating the volume of the electrochemical cell ($V_R$) in liters as from 10 to 180 times the production (P);

d) calculating the theoretical constant ($K_t$) of nitrate reduction to ammonium and/or nitrogen using formula (2):

$$K_t = \frac{-\ln(C_f/C_0)}{V_R} \cdot P \quad (2)$$

wherein the initial nitrate concentration ($C_0$), the final nitrate concentration ($C_f$) are expressed in mmol/liter, the volume of the electrochemical cell ($V_R$) is expressed in liters and the production (P) is expressed in liters/minute;

e) calculating the intensity in amperes per volume unit in liters to be applied between the anode and the cathode (I/V) of the electrochemical cell using formula (3):

$$I/V = \frac{12.87 \cdot (C_0 - C_f) \cdot K_t}{-\ln(C_f/C_0) \cdot 0.25} \quad (3)$$

wherein the initial nitrate concentration ($C_0$), the final nitrate concentration ($C_f$) are expressed in mmol/liter and $K_t$ is as calculated in step d);

f) selecting a cathode having a fractal surface (R) from 1 to 10;

g) treating a sample of the first aqueous solution in a first electrochemical cell equipped with the cathode selected in step f), an anode which is a titanium-ruthenium oxide anode having 50% of inert surface and having a surface equal to the geometric surface of the cathode selected in step f) and having a cell volume ($V_R'$) in liters equal to or less than $V_R$, by applying a continuous electrical current having an intensity such that I/V is as obtained in step e);

h) measuring the concentration of nitrate over time during the treatment of step g) and determining the experimental reaction constant ($K_e$) of nitrate reduction to ammonium and/or nitrogen using said measurements;

i) either adjusting the fractal surface of the cathode by repeating steps f) to h), wherein in each repetition the fractal surface (R) of the cathode selected in step f) is varied until the selected cathode provides an experimental value for the reaction constant ($K_e$) of nitrate reduction to ammonium and/or nitrogen which is between $0.95 \cdot K_t$ and $1.05 \cdot K_t$, wherein $K_t$ is the value of theoretical reaction constant calculated in step d); or selecting the cathode of step f) if the experimental value for the reaction constant ($K_e$) of nitrate reduction to ammonium and/or nitrogen measured in step h) is between $0.95 \cdot K_t$ and $1.05 \cdot K_t$, wherein $K_t$ is the theoretical reaction constant calculated in step d);

j) treating another sample of the first aqueous solution in the electrochemical cell of step g) wherein the cathode is as selected in step i) at an intensity per volume unit (I/V) different from that applied in step g);

k) measuring the concentration of nitrate over time during the treatment of step j) and determining the experimental reaction constant ($K_e$) of nitrate reduction to ammonium and/or nitrogen using said measurements;

l) either adjusting the intensity per volume (I/V) by repeating steps j) to k), wherein in each repetition the intensity per volume (I/V) is modified, until the selected intensity per volume (I/V) provides an experimental value for the reaction constant ($K_e$) of nitrate reduction to ammonium and/or nitrogen which is between $0.99 \cdot K_t$ and $1.01 \cdot K_t$, wherein $K_t$ is the value of theoretical reaction constant calculated in step d); or selecting the intensity per volume (I/V) of step j) if the experimental value for the reaction constant ($K_e$) of nitrate reduction to ammonium and/or nitrogen measured in step h) is between $0.99 \cdot K_t$ and $1.01 \cdot K_t$, wherein $K_t$ is the theoretical reaction constant calculated in step d);

m) calculating the theoretical reaction constant ($KN_t$) of ammonium oxidation to nitrogen using formula (4):

$$KN_t = K_t/Z \quad (4)$$

wherein Z is as obtained in step a) and $K_t$ is as obtained in step d);

n) selecting an anode having from 0% to 50% of inert surface;

o) treating another sample of the first aqueous solution in the electrochemical cell used in step g), wherein the intensity per volume unit (I/V) is as selected in step l), the cathode is as selected in step i) and the anode is as selected in step n);

p) measuring the concentration of nitrogen over time during the treatment of step o) and determining the experimental reaction constant ($KN_e$) of ammonium oxidation to nitrogen using said measurements;

q) either adjusting the percentage of inert surface of the anode by repeating steps n) to p), wherein in each repetition the percentage of inert surface of the anode selected in step n) is varied until the selected anode provides an experimental value for the reaction constant ($KN_e$) of ammonium oxidation to nitrogen value which is between $0.98 \cdot KN_t$ and $1.02 \cdot KN_t$, wherein $KN_t$ is the value of the theoretical reaction constant calculated in step m); or selecting the anode of step n) if the experimental value for the reaction constant ($KN_e$) of ammonium oxidation to nitrogen measured in step p) is between $0.98 \cdot KN_t$ and $1.02 \cdot KN_t$, wherein $KN_t$ is the theoretical reaction constant calculated in step m); whereby the volume ($V_R$) of the electrochemical cell is the one calculated in step c), the intensity per volume (I/V) to be applied between the anode and the cathode when operating the cell is the one adjusted or selected in step l), the cathode is chosen to have a fractal surface (R) value as adjusted or selected in step i), the anode is selected to have a percentage of inert surface as adjusted or selected in step q), and the geometric surface ratio between said anode and said cathode has the same value as the geometric surface ratio between the anode of step i) and the cathode of step n).

In a second aspect, the present invention relates to a process for removing nitrate ions from an aqueous solution, which comprises:
- a) providing an aqueous solution having a nitrate concentration equal to the nitrate concentration ($C_0$) of the first aqueous solution of the first aspect of the invention and a chloride concentration equal to the chloride concentration of the first aqueous solution of the first aspect of the invention,
- b) providing an electrochemical cell, having a volume of the electrochemical cell ($V_R$), a cathode and an anode equal to those obtained according to a method as defined in the first aspect;
- c) treating the aqueous solution of step a) in the electrochemical cell of step b) applying an intensity per volume unit (I/V) between said anode and said cathode, wherein the value of said intensity per volume unit (I/V) is equal to that obtained according to a method as defined in the first aspect;

whereby the resulting aqueous solution has a nitrate concentration ($C_f$) lower than the initial nitrate concentration ($C_0$) with the proviso that $C_f$ is also lower than 100 ppm, an ammonium concentration $[NH_4^+]_f$ lower than 50 ppm and a combined chlorine concentration lower than 2 ppm.

DESCRIPTION OF THE INVENTION

Method for Designing an Electrochemical Cell

The first aspect of the invention relates to a method for designing an electrochemical cell suitable for reducing the initial nitrate concentration ($C_0$) of a first aqueous solution having a nitrate concentration ($C_0$) greater than 5 ppm and a chloride concentration from 25 ppm to 1500 ppm to yield a second aqueous solution having a final nitrate concentration ($C_f$) lower than 100 ppm, an ammonium concentration $[NH_4^+]_f$ lower than 50 ppm and a combined chlorine concentration lower than 2 ppm by selecting the volume, the cathode and the anode of said cell as well as selecting the intensity per volume unit to be applied when operating said cell.

In the method of the invention for designing said electrochemical cell, the reduction of nitrate concentration ($C_0$) of the first aqueous solution is always performed in batch. Once the electrochemical cell has been designed, said cell can then be used in a process for removing nitrate ions from an aqueous solution having a nitrate concentration ($C_0$) greater than 5 ppm and a chloride concentration greater than 25 ppm, as defined in the second aspect of the present invention, either in batch or in continuous.

In the context of the present invention, the term "electrochemical cell" refers to a device or reactor having a determined volume and comprising at least to electrodes, i.e. at least one anode and at least one cathode, and electrolyte (which is an aqueous solution in the context of the present invention), wherein redox reactions take place when applying electrical energy to the electrodes.

In the context of the present invention, the term "anode" refers to the positively charged electrode wherein oxidation occurs. In the present invention, chloride ions present in water are oxidized to hypochlorite at the anode. The term "an anode" refers to one or more individual anode units (or electrodes) that act together as the element of the electrochemical cell wherein oxidation occurs.

In the context of the present invention, the term "cathode" refers to the negatively charged electrode wherein reduction occurs. In the present invention, nitrate ions present in water are reduced to ammonium ions and nitrogen gas at the cathode. The term "a cathode" refers to one or more individual cathode units (or electrodes) that act together as the element of the electrochemical cell wherein reduction occurs. Preferably the cathode comprises one cathode unit or two or more interconnected cathode units, preferably one, two, three, four, five, six, seven, eight, nine or ten interconnected cathode units. Preferably the cathode comprises one or from two to 40 interconnected cathode units, more preferably from 10 to 30 interconnected cathode units, still more preferably 20 interconnected cathode units. Alternatively, the cathode is formed by only one cathode unit.

In the context of the present invention, the term "intensity per volume unit" or "I/V" refers to the electrical current circulating between the anode and the cathode, and is expressed in A/L (Ampere/liter).

In the context of the present invention, the term "aqueous solution" refers to any type of solution comprising at least 80% of water, preferably at least 85%, more preferably at least 90%, more preferably at least 95%, more preferably at least 98%, more preferably at least 99%, more preferably at least 99.5%, still more preferably at least 99.9% of water.

Preferably, the content of chloride ions in the aqueous solution to be treated with the process of the present invention or to be used in the method of the present invention (first aqueous solution) is from 25 ppm to 1500 ppm. In particular, the content of chloride ions in the aqueous solution is from 25 ppm to less than 250 ppm when the process of the present invention is applied for obtaining drinkable water; and from 250 ppm to 1500 ppm when the process of the present invention is applied for residual water purification. If the aqueous solution has a content of chloride ions lower than 25 ppm, then chloride ions can be added, for example in the form of sodium chloride or any other suitable source of chloride ions, before using said aqueous solution in the method and process of the present invention.

The concentration of chloride ions can be determined by known procedures in the art, such as the colorimetric EPA 325.1 method (which is incorporated herein by reference) which is implemented in the commercially available chloride Spectroquant® test. This method is based on the liberation of thiocyanate ion ($SCN^-$) from mercuric thiocyanate through sequestration of mercury by chloride ion to form un-ionized mercuric chloride. In the presence of ferric ion, the liberated thiocyanate ion forms highly colored ferric thiocyanate in concentration proportional to the original chloride concentration. This method is typically performed on a colorimeter equipped with 15 mm tubular flow cell and 480 nm filters. A standard curve can be prepared by plotting peak heights of the NaCl standards against concentrations. Then, the test water sample can be analyzed in the colorimeter and the concentration is computed by comparing its peak height with the standard curve.

In the context of the present invention, the term "nitrate" refers to the anion $NO_3^-$.

The concentration of nitrate can be determined by known procedures in the art, such as the ultraviolet spectrophotometric US 4500-$NO_3^-$ B method (which is incorporated herein by reference). This method is based on UV absorption at 220 nm. Because dissolved organic matter also may absorb at 220 nm and $NO_3^-$ does not absorb at 275 nm, a second measurement made at 275 nm may be used to correct the $NO_3^-$ value. This method is typically carried out on a spectrophotometer for use at 220 nm and 275 nm with matched silica cells of 1 cm or longer light path. The procedure typically comprises the steps of filtering the test water sample (50 mL) if necessary, adding 1 mL of HCl solution and mixing thoroughly. $NO_3^-$ calibration standards may be prepared. These standards are treated in the same manner as the test water sample. Then, the spectrophotometric measurement is made by reading the absorbance or transmittance against redistilled water set at zero absorbance or 100% transmittance, respectively. A wavelength of 220 nm is used to obtain $NO_3^-$ reading and a wavelength of 275 nm to determine interference due to dissolved organic matter. For the water test sample and nitrate standards the absorbance reading at 275 nm is subtracted two times from the reading at 220 nm to obtain absorbance due to $NO_3^-$. Then a standard curve is constructed by plotting absorbance due to $NO_3^-$ against $NO_3^-$ concentration of standard solutions. The test water sample concentration is obtained directly form the standard curve using the corrected sample absorbance value.

In the context of the present invention, the term "ammonium" refers to ammonia both in the ionized ($NH_4^+$) and non-ionized ($NH_3$) form.

The concentration of ammonium can be determined by known procedures in the art, such as the colorimetric EPA 350.1 method (which is incorporated herein by reference) which is implemented in the commercially available ammonium Spectroquant® test. This method is based on the reaction of alkaline phenol and hypochlorite with ammonia to from indophenol blue that is proportional to the ammonia concentration. The blue color formed is intensified with sodium nitroprusside and measured colorimetrically. Typically, a calibration curve may be prepared by plotting the response of the colorimeter against standard concentrations. The distillation apparatus used for preparing the test water sample may be conditioned by adding 500 mL of reagent water to an 800 mL Kjeldahl flask and the distillation apparatus is steamed out until the distillate shows no trace of ammonia. The test water samples may be prepared by removing the residual chlorine by addition of dechlorinating agent equivalent to the chlorine residual. To 400 mL of sample NaOH 1N is added until the pH is 9.5. The sample may be then transferred to a 800 mL Kjeldahl flask and 25 mL of the borate buffer may be added. 300 mL may be distilled at a rate of 6-10 mL/min into 50 mL of 2% boric acid contained in a 500 mL Erlenmeyer flask. Then, the test water sample is analyzed in the colorimeter and the concentration is computed by comparing with the standard curve.

In the context of the present invention, the term "combined chlorine" refers to chlorine, and also to monochloramine, dichloramine, trichloramine and mixtures thereof. Said monochloramine, dichloramine, trichloramine compounds are chloramines that can be formed by reaction of chlorine and ammonia.

The concentration of combined chlorine can be determined as chlorine concentration by known procedures in the art, such as the spectrophotometric EPA 330.5 method (which is incorporated herein by reference) which is implemented in the commercially available chlorine Spectroquant® test. This method is based on the liberation of iodine from potassium iodide at pH 4 or less by chlorine and chloramines. The liberated iodine reacts with N,N-diethyl-p-phenylene diamine (DPD) to produce a red colored solution which is spectrophotometrically compared to a series of standards. This method is typically carried out in a spectrophotometer for use at 515 nm and cells of light path 1 cm or longer. Typically a calibration curve is obtained by preparing a series of permanganate standards covering the chlorine equivalent range. Then, 5 mL phosphate buffer may be placed in a flask, 5 mL of DPD reagent may be added and 100 mL of permanganate standard may be added. The absorbance is read at 515 nm on a spectrophotometer. The contents of the cell are returned to the flask and are then titrated with standard ferrous ammonium sulfate until the red color is discharged. The calibration curve is obtained by plotting the absorbance of the standard permanganate solutions on the vertical axis versus the titrated concentration on the horizontal axis. The test water sample may be prepared by placing 0.5 mL phosphate buffer in a flask, adding 0.5 mL DPD reagent, adding 0.1 g KI and adding 10 mL of sample. The mixture may be left to stand 2 minutes and the absorbance is read at 515 nm on a spectrophotometer. The absorbance of the test water sample is located on the vertical axis of the calibration curve and the chlorine concentration is red on the horizontal axis at the intersect to the absorbance and the calibration line.

The anode can be any conventional anode used in the field of water electrochlorination (typically used in swimming pools). These anodes are known to the skilled person and are defined below. Said anodes can be in the form of a sheet or a mesh.

In the context of the present invention, the term "inert surface" refers to the surface of the anode wherein no relevant reaction of chloride oxidation to chlorine occurs with respect to the surface of the active anode (surface of the anode wherein the oxidation of chloride to chlorine occurs). If several anodes are present, it refers to the sum of the surfaces of the several anodes wherein no reaction occurs with respect to the sum of the surfaces of the several anodes. The inert surface avoids ammonium reoxidation to nitrate in the presence of excess chlorine. As explained below, the inert surface of the anode corresponds to its uncoated surface.

In the context of the present invention, the term "fractal surface" or "R" refers to the surface ratio between the surface of the cathode in contact with the aqueous solution and the geometric surface of said cathode. This fractal surface is calculated taking into account the side of the cathode confronted with the anode. The geometric surface refers only to the 2-dimensional area of the surface of the cathode immersed in the aqueous solution, i.e. as if the cathode was flat (i.e. had a smooth surface) regardless of the irregularities present in the surface such as pores, holes or perforations, microparticles and nanoparticles. In contrast, the surface in contact with the aqueous solution refers to the surface of the cathode immersed and in contact with the aqueous solution. Thus, if the cathode has an irregular surface, such as a mesh, a porous surface, a perforated surface (holes) or with micro or nanoparticles thereon, the surface in contact with the aqueous solution is greater than the geometric surface and consequently the fractal surface (R) will be greater than 1. In the case of cathodes having a smooth surface, i.e. without irregularities on said surface such as pores, holes or perforations, microparticles and nanoparticles, the fractal surface (R) will be equal to 1. If several cathode units are present, it refers to the surface ratio between the sum of the surfaces of the several cathode units in contact with the aqueous solution and the sum of the geometric surfaces of said several cathode units.

The geometric surface of the cathode is determined by calculating the area of the cathode immersed in the aqueous solution and confronted with the anode. The area can be calculated by well known mathematical formulae and only depends on the geometry of the cathode in all cases, i.e. as if the cathode had a smooth surface regardless of the irregularities, if any, present in said surface such as pores, holes or perforations, microparticles and nanoparticles. For example, if the cathode is a rectangular perforated sheet or a rectangular mesh or a porous rectangular sheet or a rectangular sheet having micro- or nanoparticles thereon, the geometric surface of the cathode is the surface of the rectangle, which is calculated as the product of the length and the width of the two sides forming the rectangle. Usually the one or more cathode units are parallel to the one or more anode units. However, should this not be the case, then the geometric surface of the cathode corresponds to the normal surface, i.e. the projected surface on a plane parallel to the plane of the anode.

When the cathode is a perforated sheet, the surface of said cathode in contact with the aqueous solution can be calculated as the sum of the non-perforated area and the total internal area of the perforations or holes.

Figure 1:
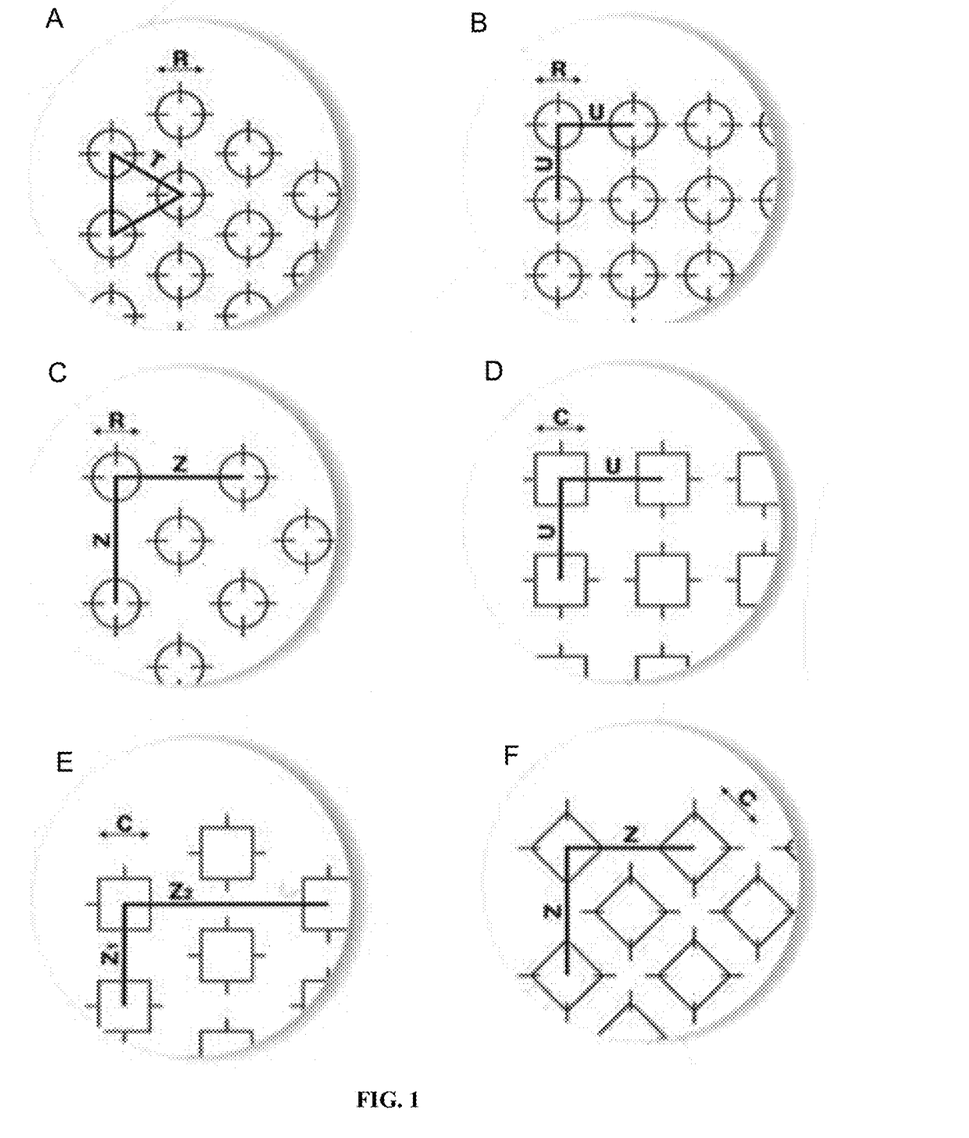
FIG. 1 shows the different configurations of perforations on a sheet and the variables used for the calculation of the open area according to the formulae gathered in Table 1.

The non-perforated area can be calculated by subtracting the surface of the perforations (i.e. holes) in the cathode to the geometric surface of the cathode (as if it were an unperforated sheet). The surface of the perforations or holes is calculated as the product of the surface of the equivalent unperforated sheet and the open area, wherein the open area (OA, ratio between the total area of the holes and total sheet area) is calculated with known mathematical formulae which are shown in FIG. 1 and Table 1, and depends from the geometry of the and the distribution of said holes on the surface (Designers, Specifiers And Buyers Handbook For Perforated Metals. Industrial Perforators Association (IPA), Washington (1993), page 49).

TABLE 1

| Type of perforations | Formula to calculate the open area | Reference in FIG. 1 |
|---|---|---|
| Round holes 60° staggered | $\dfrac{R^2 \cdot 0.906}{T^2}$ | A |
| Round holes Straight | $\dfrac{R^2 \cdot 0.785}{U^2}$ | B |
| Round holes 45° staggered | $\dfrac{R^2 \cdot 1.57}{Z^2}$ | C |
| Square holes Straight | $\dfrac{C^2}{U^2}$ | D |
| Square holes Staggered | $\dfrac{2 \cdot C^2}{Z_1 \cdot Z_2}$ | E |

TABLE 1-continued

| Type of perforations | Formula to calculate the open area | Reference in FIG. 1 |
|---|---|---|
| Romboid holes Staggered | $\dfrac{2 \cdot C^2 \cdot D^2}{Z^2}$ | F |
| Rectangular holes Straight | $\dfrac{C \cdot L}{U_1 \cdot U_2}$ | G |
| Rectangular holes Staggered | $\dfrac{2 \cdot C \cdot L}{Z_1 \cdot Z_2}$ | H |
| Slot holes Straight | $\dfrac{C \cdot L - 0.215 \cdot C^2}{U_1 \cdot U_2}$ | I |
| Slot holes Staggered | $\dfrac{C \cdot L - 0.43 \cdot C^2}{Z_1 \cdot Z_2}$ | J |

The total internal area of the perforations or holes can be calculated as the product of the perimeter of one hole or perforation (which depends on the geometry of said hole and is well established by known mathematical formulae) and the thickness of the cathode sheet. For example, if the cathode is perforated with round holes (i.e. circles), the internal area of the perforations is calculated as the product of the thickness of the sheet (in cm) and the perimeter of the circle ($2 \cdot \Pi \cdot r$, wherein r is the radius of the circle (hole) in cm). The total internal area of the perforations or holes is then calculated as the product of the internal area of each perforation (or hole) and the number of perforations (or holes) present in the cathode.

The number of perforations (or holes) present in the cathode is calculated as the division between the perforated area and the surface of one perforation (or hole), wherein the surface of the perforations or holes is calculated as described above (i.e. the product of the surface of the equivalent unperforated sheet and the open area). For example, if the cathode is perforated with round holes, the number of holes can be calculated as the division of the perforations, which is calculated as described above, and the surface of one perforation, which is calculated as the surface of a circle ($\Pi \cdot r^2$, wherein r is the radius of the circle (hole)).

When the cathode is a mesh, the surface of said cathode in contact with the aqueous solution can be calculated by known mathematical formula, such as explained above with respect to sheets perforated with square holes or rectangular holes.

The surface of the cathode in contact with the aqueous solution can also be calculated based on the BET (Brunauer, Emmett and Teller) theory, which is a well-accepted theory known in the art for the calculation of surface areas of solids by means of measuring their physical adsorption of gas molecules (See S. Brunauer, P. H. Emmett and E. Teller, J. Am. Chem. Soc., 1938, 60, 309). In particular, the surface can be calculated from the BET surface area plot obtained by measuring the quantity of nitrogen gas molecules adsorbed by the cathode at (P/PO) within the range 0.05-0.3, at 77K. This method is particularly suitable for calculating the surface in contact with the aqueous solution in porous cathodes or cathodes having micro or nanoparticles thereon.

The first step in the method, step a), is calculating parameter Z. This parameter represents the ratio between the reaction constant (K) of nitrate reduction to ammonium and/or nitrogen and the reaction constant (KN) of ammonium oxidation to nitrogen. In the method of the present invention, parameter Z is calculated using formula (1):

$$Z = \frac{-\ln(C_f/C_0)}{C_0 - C_f - [NH_4^+]_f} \quad (1)$$

wherein the initial nitrate concentration ($C_0$) of the first aqueous solution, the final nitrate concentration ($C_f$) and the final ammonium concentration ($[NH_4^+]_f$) of the second aqueous solution are expressed in mmol/liter.

This Z parameter is obtained by simple calculation using the above equation taking into account the nitrate concentration ($C_0$) of the first aqueous solution (i.e. the aqueous solution that will be treated with the process of the present invention to yield a second aqueous solution having a nitrate concentration ($C_f$) lower than 50 ppm, an ammonium concentration $[NH_4^+]_f$ lower than 50 ppm, preferably an ammonium concentration lower than 0.5 ppm (for water purification to obtain drinking water), and a combined chlorine concentration lower than 2 ppm.

The second step in the method of the present invention, step b), is fixing the production (P) in liters/minute of the electrochemical cell, defined as the volume per minute of first aqueous solution that it is desired that the electrochemical cell is capable of treating. This parameter is fixed by the user. Typically the production is from 0.01 L/min to 100 L/min, preferably from 0.05 L/min to 10 L/min, more preferably from 0.1 L/min to 5 L/min, still more preferably from 0.1 L/min to 1 L/min.

The third step in the method of the present invention, step c), is calculating the volume of the electrochemical cell ($V_R$), and is expressed in liters. This parameter is calculated as from 10 to 180 times the production (P) selected in the previous step, preferably from 10 to 100 times the production, more preferably from 15 to 60 times the production, more preferably from 15 to 35 times the production, more preferably from 15 to 25 times the production, still more preferably 20 times the production.

The next step in the method of the present invention, step d), is calculating the theoretical constant ($K_t$) of nitrate reduction to ammonium and/or nitrogen using formula (2):

$$K_t = \frac{-\ln(C_f/C_0)}{V_R} \cdot P \quad (2)$$

wherein the initial nitrate concentration ($C_0$), the final nitrate concentration ($C_f$) are expressed in mmol/liter, the volume of the electrochemical cell ($V_R$) is expressed in liters and the production (P) is expressed in liters/minute.

This $K_t$ value is obtained by simple calculation using the above equation (2) taking into account the nitrate concentration ($C_0$) of the first aqueous solution that will be treated with the process of the present invention and the final nitrate concentration ($C_f$); the target nitrate concentration to be achieved ($C_f$) after applying the process for reducing the nitrate concentration of said aqueous solution (i.e. the nitrate concentration of the second aqueous solution); the production (P) in liters/min previously fixed; and the $V_R$ in liters previously calculated.

The next step in the method of the present invention, step e), is calculating the intensity in amperes per volume unit in liters to be applied between the anode and the cathode (I/V) of the electrochemical cell using formula (3):

$$I/V = \frac{12.87 \cdot (C_0 - C_f) \cdot K_t}{-\ln(C_f/C_0) \cdot 0.25} \quad (3)$$

wherein the initial nitrate concentration ($C_0$), the final nitrate concentration ($C_f$) are expressed in mmol/liter and $K_t$ is as calculated in step d).

This I/V value is obtained by simple calculation using the above equation (3) taking into account the nitrate concentration ($C_0$) of the first aqueous solution, the target nitrate concentration to be achieved ($C_f$) using the process of the present invention, i.e. the nitrate concentration of the second aqueous solution, and the $K_t$ previously calculated in step d) using equation (2).

The next step in the method of the present invention, step f) is selecting a cathode having a fractal surface (R) from 1 to 10. The "fractal surface" or "R" has been defined above and refers to the surface ratio between the surface of the cathode in contact with the aqueous solution that is treated and the geometric surface of said cathode. Preferably, a cathode having a fractal surface from 1 to 3 is selected, more preferably a cathode having a fractal surface from 1 to 1.4 is selected. In another embodiment, a cathode having a fractal surface selected from the group consisting of 1, 1.2, 1.4 and 1.6 is selected.

The cathode can be any cathode suitable for reducing nitrate ions present in an aqueous solution to ammonium and/or nitrogen. These cathodes are known in the art. Suitable cathodes are those comprising a conductor metal having a redox potential of $Me^0$ to $Me^{+n}$, wherein Me is metal and n is the valence of said metal, lower than 1000 mV. Preferably, the cathode comprises a metal selected from the group consisting of iron, steel, galvanized iron, galvanized steel, galvanized aluminum, galvanized tin and galvanized nickel. More preferably, the cathode comprises iron or galvanized iron. The term "galvanized" is well known in the art and refers to a protective zinc coating. The cathode can have different surface structures, i.e. it can have a solid smooth surface, it can have a porous surface, it can have a smooth surface with nano or microparticles thereon. Thus, the cathode can be selected from the group consisting of a perforated sheet, a mesh, a porous sheet, and a sheet comprising microparticles or nanoparticles thereon.

In the context of the present invention, the term "sheet" refers to a solid structure having a smooth surface, i.e. without holes or particles. In the context of the present invention, the term "perforated sheet" refers to a thin and rectangular structure having holes or perforations. In perforated cathodes, the holes can have different shapes such as round (circles), square, rectangular, rhomboid, and slot holes (ellipsoid), among others. In the context of the present invention, the term "mesh" refers to connected strands, i.e. similar to a web or a net in that it has many attached or woven strands. In the context of the present invention, the term "porous sheet" refers to a solid structure having an uneven surface, i.e. a surface having pores from 10 to 100 µm. In the context of the present invention, the term "microparticles" refers to particles having a size from 1 µm to 1000 µm, preferably from 10 µm to 500 µm. In the context of the present invention, the term "nanoparticles" refers to particles having a size from 1 nm to 1000 nm, preferably from 10 nm to 500 nm.

The cathodes described in the present invention can have different 3-dimensional shapes, preferably it is a rectangular parallelepiped.

The preferred cathodes are perforated sheets, preferably having a thickness of from 0.5 mm to 5 mm, more preferably from 1 mm to 3 mm.

The next step in the method of the present invention, step g), is treating a sample of the first aqueous solution in an electrochemical cell equipped with the cathode selected in step f), an anode which is a titanium-ruthenium oxide anode having 50% of inert surface and having a surface equal to the geometrical surface of the cathode selected in step f) and having a cell volume ($V_R'$) in liters equal to or less than $V_R$, by applying a continuous electrical current having an intensity such that I/V is as obtained in step e). The titanium-ruthenium oxide anode used in this step is a standard anode of titanium coated with ruthenium oxide, such as the commercial 7030 titanium-ruthenium anode (Magneto Special Anodes).

Preferably, the electrochemical cell used in this step has a volume ($V_R'$) less than the volume $V_R$ calculated in previous step c), i.e. the electrochemical cell used in this step is smaller than the electrochemical cell to be designed with the method of the present invention. Preferably, $V_R'$ is 5 to 15 times smaller than $V_R$. More preferably $V_R'$ is from 1 liters to 5 liters.

The first aqueous solution is treated until the target nitrate, ammonium and combined chlorine concentrations are obtained, i.e. until the second aqueous solution has a nitrate concentration ($C_f$) lower than 100 ppm, preferably lower than 50 ppm, an ammonium concentration $[NH_4^+]_f$ lower than 50 ppm, preferably an ammonium concentration lower than 0.5 ppm (i.e. water purification to obtain drinking water), and a combined chlorine concentration lower than 2 ppm. The nitrate, ammonium and combined chlorine concentrations can be determined by common procedures in the art, such as those previously defined. The second aqueous solution always has a nitrate concentration $C_f$ lower than the nitrate concentration $C_0$ of the first aqueous solution.

The next step in the method of the present invention, step h), is measuring the concentration of nitrate over time during the treatment of step g) and determining the experimental reaction constant ($K_e$) of nitrate reduction to ammonium and/or nitrogen using said measurements.

The nitrate concentration can determined by common procedures in the art, such as those previously defined. In the method of the invention, wherein the aqueous solution is treated in batch, $K_e$ corresponds to the slope of the straight line of $-\ln(C/C_0)$, in the vertical axis, versus time (in minutes) in the horizontal axis plot, wherein C corresponds to the nitrate concentration at each point of time, i.e. it represents the variation of the nitrate concentration; $C_0$ is the nitrate concentration of the aqueous solution that is treated, i.e. the initial nitrate concentration of the first aqueous solution that is fed into the electrochemical cell of step g); and the time is expressed in minutes.

The next step in the method of the present invention, step i), is adjusting the fractal surface of the cathode by repeating steps f) to h), wherein in each repetition the cathode selected in step f) is varied until the selected cathode provides an experimental value for the reaction constant ($K_e$) of nitrate reduction to ammonium and/or nitrogen which is between $0.95 \cdot K_t$ and $1.05 \cdot K_t$, wherein $K_t$ is the theoretical reaction constant calculated in step d), preferably until the selected cathode provides an experimental value for the reaction constant ($K_e$) of nitrate reduction to ammonium and/or nitrogen which is between $0.97 \cdot K_t$ and $1.03 \cdot K_t$, wherein $K_t$ is the theoretical reaction constant calculated in step d). The aim of this step is selecting the cathode providing the experimental $K_e$ closest to the theoretical $K_t$ calculated in step d). This is achieved by varying the fractal surface of the cathode. This variation is performed by selecting each time a cathode a different fractal surface. Said cathode is selected each time as having a fractal surface from 1 to 3, more preferably a fractal surface from 1 to 1.4. In another embodiment, said cathode is selected each time as having a fractal surface selected from the group consisting of 1, 1.2, 1.4 and 1.6. Typically step i) is carried out two or three times.

Alternatively, if the cathode of step f) already provides an experimental value for the reaction constant ($K_e$) of nitrate reduction to ammonium and/or nitrogen measured in step h) which is between $0.95 \cdot K_t$ and $1.05 \cdot K_t$, preferably between $0.97 \cdot K_t$ and $1.03 \cdot K_t$, wherein $K_t$ is the theoretical reaction constant calculated in step d), then the fractal surface does not need to be adjusted and step i) is just selecting the cathode of step f).

The next step in the method of the present invention, step j), is treating another sample of the first aqueous solution in the electrochemical cell of step g), i.e. an electrochemical cell having a volume ($V_R'$) in liters equal to or less than $V_R$, wherein the cathode is as selected in step i) at an intensity per volume unit (I/V) different from that applied in step g). The I/V is typically varied between ±0.1 A/L the value applied in step g) (i.e. between I/V+0.1 and I/V−0.1, wherein I/V is the value applied in step g)).

Therefore, the next step, step k), is measuring the concentration of nitrate over time during the treatment of step j) and determining the experimental reaction constant ($K_e$) of nitrate reduction to ammonium and/or nitrogen using said measurements. This determination can be performed as explained above, i.e. by determining the decrease of the nitrate concentration with the time and calculating $K_e$ as the slope of the straight line obtained in the $-\ln(C/C_0)$ versus time plot.

The next step in the method of the present invention, step l), is adjusting the intensity per volume (I/V) by repeating steps j) to k), wherein in each repetition the intensity per volume (I/V) is modified, until the selected intensity per volume (I/V) provides an experimental value for the reaction constant ($K_e$) of nitrate reduction to ammonium and/or nitrogen which is between $0.99 \cdot K_t$ and $1.01 \cdot K_t$, wherein $K_t$ is the value of theoretical reaction constant calculated in step d). The aim of this step is adjusting the I/V until the experimental $K_e$ corresponds to the theoretical $K_t$, i.e. that calculated in step d). Typically step l) is carried out two or three times. Preferably, the I/V value is varied between ±0.1 A/L the value applied in the previous performance of step j) (i.e. between I/V+0.1 and I/V−0.1, wherein I/V is the value applied in the previous performance of step j)).

Alternatively, if the intensity per volume (I/V) of step j) already provides an experimental value for the reaction constant ($K_e$) of nitrate reduction to ammonium and/or nitrogen measured in step h) which is between $0.99 \cdot K_t$ and $1.01 \cdot K_t$, wherein $K_t$ is the theoretical reaction constant calculated in step d), then the intensity per volume (I/V) does not need to be adjusted and step l) is just selecting the intensity per volume (I/V) of step j).

The next step in the method of the present invention, step m), is calculating the theoretical reaction constant ($KN_t$) of ammonium oxidation to nitrogen using formula (4):

$$KN_t = K_t/Z \qquad (4)$$

wherein Z is as obtained in step a) and $K_t$ is as obtained in step d).

This $KN_t$ value is obtained by simple calculation using the above equation (4) taking into account the Z which has been obtained in step a) and the $K_t$ value that has been determined in step k).

The next step in the method of the present invention, step n), is selecting an anode having from 0% to 50% of inert surface.

Suitable anodes are known to those skilled in the art. The anode can be any conventional anode used in saline electrochlorination. Preferably, the anode comprises titanium, platinized titanium, aluminum, anodized aluminum, graphite and mixtures thereof. More preferably titanium which is partially or totally coated with a material selected from the group consisting of ruthenium oxide, iridium oxide, platinum oxide and mixtures thereof.

The uncoated surface of the anode corresponds to the "inert surface" of the anode, which has been defined above and refers to the surface of the anode wherein the oxidation of chloride ions present in the aqueous solution to hypochlorite does not occur in relation to activity of "active zone". If several anode units are present, it refers to the sum of the surfaces of the several anode units wherein no reaction occurs, for example, if coated and uncoated anode units are present the inert surface refers to the sum of uncoated surfaces. The percentage of inert surface of an anode is expressed with respect to the total surface of the anode. For example, if coated and uncoated anode units are present the percentage of inert surface of the anode refers to the sum of uncoated surfaces of said uncoated anode units with respect to the total surface of said coated and uncoated anode units. The total surface of the anode refers to the geometric area of the anode that is confronted with the cathode and immersed in the aqueous solution. Preferably, the anode of step n) has an inert surface selected from the group consisting of 0% (i.e. fully coated anode), 10%, 20%, 25%, 33% and 50%. These values of percentage of inert surface of the anode are to be interpreted as the given number±0.5%. Preferably, the inert surface of the anode comprises of a material selected from the group consisting of titanium, platinized titanium, aluminum, anodized aluminum, graphite and mixtures thereof. If several anodes are present, the inert surface of each of them can be selected for the previously mentioned materials, and said anodes may comprise the same or different materials forming the inert surface.

The next step in the method of the present invention, step o), is treating another sample of the first aqueous solution in the electrochemical cell used in step g) i.e. an electrochemical cell having a volume ($V_R'$) in liters equal to or less than $V_R$ and wherein the cathode is as selected in step i), but wherein the intensity per volume unit (I/V) is as selected in step l) and the anode is as selected in step n).

The next step in the method of the present invention, step p), is measuring the concentration of nitrogen over time during the treatment of step o) and determining the experimental reaction constant ($KN_e$) of ammonium oxidation to nitrogen using said measurements.

The total nitrogen concentration (concentration of nitrogen atoms) is determined as the difference between the sum of initial concentrations of ammonium and nitrate present in the aqueous solution that is fed to the electrochemical cell and the sum of concentrations of ammonium and nitrate at a specific time. The nitrate and ammonium concentrations can be determined by common procedures in the art, such as those previously defined. $KN_e$ corresponds to the slope of the straight line of total nitrogen concentration versus time plot, wherein the nitrogen concentration is expressed in mmol/L and plotted in the vertical axis and the time is expressed in minutes and plotted in the horizontal axis.

The next step in the method of the present invention, step q), is adjusting the percentage of inert surface of the anode by repeating steps n) to p), wherein in each repetition the percentage of inert surface of the anode selected in step n) is varied until the selected anode provides an experimental value for the reaction constant ($KN_e$) of ammonium oxidation to nitrogen value which is between $0.98 \cdot KN_t$ and $1.02 \cdot KN_t$, wherein $KN_t$ is the value of the theoretical reaction constant calculated in step m), preferably until the selected anode provides an experimental value for the reaction constant ($KN_e$) of ammonium oxidation to nitrogen value which is between $0.99 \cdot KN_t$ and $1.01 \cdot KN_t$, wherein $KN_t$ is the value of the theoretical reaction constant calculated in step m). The aim of this step is adjusting the percentage of inert surface of the anode until the experimental $KN_e$ obtained corresponds to the theoretical $KN_t$, i.e. that calculated in step m). Typically step q) is carried out two or three times.

Alternatively, if the anode selected in step n) already provides an experimental value for experimental value for the reaction constant ($KN_e$) of ammonium oxidation to nitrogen (measured in step p)) which is between $0.98 \cdot KN_t$ and $1.02 \cdot KN_t$, preferably between $0.99 \cdot KN_t$ and $1.01 \cdot KN_t$, wherein $KN_t$ is the theoretical reaction constant calculated in step m), then the percentage of inert surface of the anode does not need to be adjusted and step q) is just selecting the anode of step n).

Performing steps a) to q) described above provides an electrochemical cell wherein the volume ($V_R$) of the electrochemical cell is the one calculated in step c), the intensity per volume (I/V) to be applied between the anode and the cathode when operating the cell is the one adjusted or selected in step l), the cathode is chosen to have a fractal surface (R) value as adjusted or selected in step i), the anode is selected to have a percentage of inert surface as adjusted or selected in step q). The geometric surface ratio between said anode and said cathode has the same value as the geometric surface ratio between the anode of step i) and the cathode of step n). When reference is made to that the cathode is chosen to have a fractal surface (R) value as adjusted or selected in step i) it implies that the material of the chosen cathode is also the same as that of the cathode of step i). Similarly, when reference is made to that the anode is selected to have a percentage of inert surface as adjusted or selected in step q) in also implies that the material of the selected anode is the same as that of the anode of step q).

The definitions of geometric surfaces of the cathode and of the anode correspond to that previously defined with respect to the geometric surface of the cathode.

An electrochemical cell having the volume, anode and cathode obtained with the method described above is suitable for reducing the nitrate concentration ($C_0$) of a first aqueous solution to yield a second aqueous solution having a nitrate concentration ($C_f$) lower than 100 ppm, an ammonium concentration $[NH_4^+]_f$ lower than 50 ppm and a combined chlorine concentration lower than 2 ppm, when applying an intensity per volume unit having a value as obtained with the method described above. The nitrate concentration of the second aqueous solution ($C_f$) is always lower than that of the first aqueous solution ($C_0$).

Process for Removing Nitrate Ions from an Aqueous Solution

The process for water treatment of the present invention provides water that has a nitrate concentration ($C_f$) lower than 100 ppm, an ammonium concentration $[NH_4^+]_f$ lower than 50 ppm and a combined chlorine concentration lower than 2 ppm. This is achieved by synchronizing the time to decrease the nitrate concentration $C_0$ to the target value $C_f$ with the time to obtain the target value of ammonium concentration $[NH_4^+]_f$, which is lower than 50 ppm, preferably lower than 0.5 ppm for drinking water.

In order to obtain this synchronicity, an electrochemical cell having a specific design needs to be used, in particular with respect to the volume of said electrochemical cell ($V_R$), the cathode, the anode, and the intensity per volume unit (I/V) that is applied between said anode and said cathode when treating an aqueous solution. This electrochemical cell can be designed by applying the method described in the first aspect of the present invention. Preferably, the electrochemical cell is designed by applying the method described in the first aspect.

Thus, the second aspect relates to a process for removing nitrate ions from an aqueous solution.

The first step in the process of the present invention, step a), is providing an aqueous solution having a nitrate concentration equal to the nitrate concentration ($C_0$) of the first aqueous solution used in designing the electrochemical cell and a chloride concentration equal to the chloride concentration of the first aqueous used in designing the electrochemical cell. In an embodiment said nitrate concentration $C_0$ is greater than 5 ppm, preferably greater than 125 ppm or lower than 123 ppm, preferably lower than 100 ppm, more preferably lower than 90 ppm, more preferably lower than 80 ppm, more preferably lower than 70 ppm, more preferably lower than 60 ppm, more preferably lower than 55 ppm. In all these embodiments, $C_0$ is greater than 5 ppm, preferably greater than 15 ppm.

The process of the present invention provides an aqueous solution having a nitrate concentration ($C_f$) which is always lower than the nitrate concentration ($C_0$) of the aqueous solution provided in step a) and is preferably lower than 100 ppm.

Preferably, said aqueous solution has a chloride ion concentration of from 25 ppm to 1500 ppm. In particular, the content of chloride ions in the aqueous solution is from 25 ppm to less than 250 ppm when the process of the present invention is applied for obtaining drinking water; and from 250 ppm to 1500 ppm when the process of the present invention is applied for residual water purification. If the aqueous solution has a content of chloride ions lower than said values, in particular lower than 25 ppm, then chloride ions can be added, for example in the form of sodium chloride or any other suitable source of chloride ions, before or during treatment of said aqueous solution in the process of the present invention. The concentration of nitrate ions and chloride ions can be determined by known procedures in the art, such as those previously described.

In one embodiment, the aqueous solution provided in step a) is selected from the group consisting of ground water, domestic waste water, stagnant water (such as in fountains and sport lakes) and industrial waste water.

The nitrate concentration ($C_0$) of the aqueous solution to be treated with the process of the invention, the final nitrate concentration ($C_f$) to be achieved after said treatment and the target ammonium concentration $[NH_4^+]_f$ to be achieved after said treatment and the production (P) are determinant for selecting the appropriate electrochemical cell wherein the aqueous solution is to be treated. In this regard, the method described in the first aspect provides the electrochemical cell parameters that are suitable for that purpose. Preferably, the method described in the first aspect is used for obtaining said electrochemical cell parameters.

Thus, the second step in the process of the present invention, step b), is providing an electrochemical cell, having a volume of the electrochemical cell ($V_R$), a cathode and an anode equal to those obtained according to a method as defined in the first aspect (i.e. the cathode has a fractal surface (R) value as adjusted or selected in step i) of the method as defined in the first aspect, the anode is selected to have a percentage of inert surface as adjusted or selected in step q) of the method as defined in the first aspect, and the geometric surface ratio between said anode and said cathode has the same value as the geometric surface ratio between the anode of step i) and the cathode of step n) of the method as defined in the first aspect). Preferably said volume of the electrochemical cell ($V_R$), said cathode and said anode are selected using the method defined in the first aspect.

Once the electrochemical cell has been provided, the third step in the process of the present invention, step c), is treating the aqueous solution provided in step a) in the electrochemical cell provided in step b) applying an intensity per volume unit (I/V) between said anode and said cathode, wherein the value of said intensity per volume unit (I/V) is equal to that obtained according to the process defined in the first aspect. Preferably, said intensity per volume unit (I/V) value is obtained using the method defined in the first aspect.

After the treatment with the process of the present invention, the resulting aqueous solution has a nitrate concentration ($C_f$) which is lower than the initial nitrate concentration ($C_0$) and also lower than 100 ppm, an ammonium concentration $[NH_4^-]_f$ lower than 50 ppm, and a combined chlorine concentration lower than 2 ppm. The resulting aqueous solution always has a nitrate concentration ($C_f$) lower than the nitrate concentration ($C_0$) before being subjected to the treatment with the process of the present invention. Preferably, the resulting aqueous solution has a nitrate concentration $C_f$ lower than 50 ppm (in particular for obtaining drinking water). Preferably, the resulting aqueous solution has an ammonium concentration $[NH_4^+]_f$ lower than 0.5 ppm (for water purification to obtain drinking water). Preferably, the resulting aqueous solution has a chloride concentration lower than 1500 ppm, in particular when the water that is treated with the process of the invention is residual waste water. Preferably, the resulting aqueous solution has a chloride concentration lower than 250 ppm, in particular when the water to be obtained after treatment with the process of the invention is drinking water.

The process of the present invention can be carried out in batch or in continuous. When performing the process in batch, the aqueous solution to be treated is fed into the electrochemical cell, is treated with the process described above and is then removed from the electrochemical cell once the target values of nitrate concentration ($C_f$), ammonium concentration and combined chlorine concentration have been obtained. When performing the process in continuous, the aqueous solution to be treated is fed into the electrochemical cell without interruption, while being treated with the process described above, and removed from the electrochemical cell without interruption providing an aqueous solution wherein the nitrate concentration ($C_f$), ammonium concentration and combined chlorine concentration corresponds to the target values. In one embodiment the process is carried out in batch. In another embodiment the process is carried out in continuous.

The following examples represent specific embodiments of the present invention. They do not intend to limit in any way the scope of the invention defined in the present description.

EXAMPLES

Electrochemical Cell Design.

Table 2 shows water specifications in terms of nitrate ($[NO_3^-]_0=C_0$) and chlorine ($[Cl^-]_0$) concentrations of the water that will be treated with the process of the invention and the target nitrate ($[NO_3^-]_f=C_f$), ammonium ($[NH_4^+]_f$) and combined chlorine ([combined chlorine]$_f$) concentrations after water purification.

TABLE 2

|  | Example A | Example B | Comparative example C | Comparative example D |
|---|---|---|---|---|
| $[NO_3^-]_0 = C_0$ | 80 ppm | 150 ppm | 80 ppm | 150 ppm |
| $[Cl^-]_0$ | 200 ppm | 200 ppm | 200 ppm | 200 ppm |
| $[NO_3^-]_f = C_f$ | 40 ppm | 40 ppm | 40 ppm | 40 ppm |
| $[NH_4^+]_f$ | <0.5 ppm | <0.5 ppm | <0.50 ppm | <0.0 ppm |
| [combined chlorine]$_f$ | <2 ppm | <2 ppm | <2 ppm | <2 ppm |

Using the above values, the following electrochemical cell parameters are calculated for the treatment of Examples A and B with the method of the invention (Table 3). Comparative examples C and D are performed using an electrochemical cell having parameters different from those obtained with the method of the invention (Table 3).

TABLE 3

|  | Example A | Example B | Comparative example C | Comparative example D |
|---|---|---|---|---|
| Z | [1]1.07 mM$^{-1}$ | [1]0.74 mM$^{-1}$ | [1]1.07 mM$^{-1}$ | [1]0.74 mM$^{-1}$ |
| P | 0.54 L/min | 0.10 L/min | 0.44 L/min | 0.197 L/min |
| $V_R$ | 12 L | 16 L | 12 L | 26 L |
| $K_t$ | [2]0.0313 min$^{-1}$ | [2]0.0082 min$^{-1}$ | [2]0.0253 min$^{-1}$ | [2]0.010 min$^{-1}$ |
| I/V | [3]1.5 A/L | [3]0.6 A/L | 1.5 A/L | 0.58 A/L |
| R | [5]1.28 | [4]1 | [4]1 | [4]1 |
| KN | [6]0.029 mM · min$^{-1}$ | [6]0.011 mM · min$^{-1}$l$^{-1}$ | [7]0.032 mM · min$^{-1}$l$^{-1}$ | [7]0.011 mM · min$^{-1}$l$^{-1}$ |
| Inert surface anode | [8]20% | [8]25% | [9]0% | [9]0% |
| Geometric surface cathode | 6000 cm$^2$ | 6000 cm$^2$ | 6000 cm$^2$ | 6000 cm$^2$ |
| Geometric surface anode | 6000 cm$^2$ | 6000 cm$^2$ | 6000 cm$^2$ | 6000 cm$^2$ |

[1]Calculated with equation (1)
[2]Calculated with equation (2)
[3]Obtained according to step 1) of the method of the present invention
[4]One non-perforated iron sheet cathode
[5]One iron sheet cathode perforated with round holes
[6]Calculated with equation (4)
[7]Experimentally determined following the procedure described in the present document for determining KN$_e$
[8]Ti—Ru anode (i.e. wherein the coated surface contains ruthenium oxide)
[9]Fully coated titanium anode All the anodes were titanium anodes coated with ruthenium oxide to provide the indicated percentage of inert surface and were purchased from Magneto Special Anodes. The cathodes were purchased form Pideca S. A.

The design of the electrochemical cells used in examples A and B comprises the following steps.

Step a):
Z is calculated using formula (1). The resulting values are provided in Table 3.

Step b):
P is fixed to have the values shown in Table 3.

Step c):
$V_R$ is calculated as 22.2 times the production in example A and as 160 times the production in example B.

Step d):
$K_t$ is calculated using formula (2). The resulting values are provided in Table 3.

Step e):
I/V is calculated using formula (3). The resulting values are 1.5 A/L in example A and 0.57 A/L in example B.

Step f):
A cathode having a fractal surface R=1 is selected in example A; this cathode is an unperforated iron sheet having a geometric surface of 500 cm$^2$. A cathode having a fractal surface R=1.1 is selected in example B; this cathode is an iron sheet perforated with round holes and that has a geometric surface of 500 cm$^2$.

Step g):
A 1 L water sample (having the specifications shown in Table 2) is treated in a polyethylene reactor having a volume $V_R'=1.2$ L, using the cathode selected in step f), an anode which is a Titanium-Ruthenium standard anode having a percentage of inert surface of 50% and a geometric surface of 500 cm$^2$ (commercial 7030 titanium anode coated with ruthenium oxide), by applying an electrical intensity corresponding to that obtained in step e) (i.e. 1.5 A/L in example A and 0.57 A/L in example B).

Step h):
The concentration of nitrate (in mmol/L) over time (min) is measured and the straight line obtained of $-\ln(C/C_0)$ in the y-axis versus time in the x-axis is plotted. $K_e$ is determined as the slope of this straight line and has a value of 0.025 min$^{-1}$ in example A and of 0.010 min$^{-1}$ in example B.

Step i):

Example A

Treatment of a water sample is repeated (steps f) to h)) selecting a cathode having a fractal surface R=1.1 (iron sheet perforated with round holes and having geometric surface of 500 cm$^2$), the obtained $K_e$ is 0.0265 min$^{-1}$ (determined as described in step h)). The test is repeated but selecting a cathode having a fractal surface R=1.2 (iron sheet perforated with round holes and having geometric surface of 500 cm$^2$), the obtained $K_e$ is 0.0278 min$^{-1}$ (determined as described in step h)). The test is repeated once more but selecting a cathode having a fractal surface R=1.28 (iron sheet perforated with 3 mm² rhombic holes and having geometric surface of 500 cm², a thickness of 1 mm), the obtained $K_e$ is 0.030 min⁻¹ (determined as described in step h)), which is 0.96·$K_t$. Thus, the cathode having the fractal surface R=1.28 is selected.

Example B

Treatment of a water sample is repeated (steps f) to h)) selecting a cathode having a fractal surface R=1.05 (iron sheet perforated with round holes and having geometric surface of 500 cm²), the obtained $K_e$ is 0.0087 min⁻¹ (determined as described in step h)). The test is repeated but selecting a cathode having a fractal surface R=1 (unperforated iron sheet perforated having geometric surface of 500 cm²), the obtained $K_e$ is 0.0080 min⁻¹ (determined as described in step h)), which is 0.97·$K_t$. Thus, the cathode having the fractal surface R=1 is selected.

Step j):

Example A

Treatment of a water sample is repeated in the electrochemical cell used in step g) with the cathode selected in step i) (R=1.28, iron sheet perforated with 3 mm² rhombic holes, geometric surface of 500 cm² and thickness of 1 mm), wherein I/V is 1.53 A/L.

Example B

Treatment of a water sample is repeated in the electrochemical cell used in step g) with the cathode selected in step i) (R=1, unperforated iron sheet perforated, geometric surface of 500 cm²), wherein I/V is 0.6 A/L.

Step k):

The concentration of nitrate (in mmol/L) over time (min) is measured and the straight line obtained of $-\ln(C/C_0)$ in the y-axis versus time in the x-axis is plotted. $K_e$ is determined as the slope of this straight line and has a value of 0.0312 min⁻¹ in example A (which is 1.00·$K_t$) and of 0.00825 min⁻¹ (which is 1.006·$K_t$) in example B.

Step l):

The I/V values obtained in step k) are selected, i.e. 1.5 A/L in example A and 0.6 A/L in example B.

Step m):

$KN_t$ is calculated using formula (4). The resulting values are provided in Table 3.

Step n):

An anode having a percentage of inert surface of 33.3% is selected both in example A and B (Titanium-Ruthenium anode, geometrical surface of 500 cm²).

Step o):

Example A

Treatment of a water sample is repeated in the electrochemical cell used in step g) with the cathode selected in step i) (R=1.28, iron sheet perforated with 3 mm² rhombic holes, geometric surface of 500 cm² and thickness of 1 mm), wherein I/V is as selected in step 1), i.e. 1.5 A/L, and wherein the anode is as selected in step n) (33.3% inert surface).

Example B

Treatment of a water sample is repeated in the electrochemical cell used in step g) with the cathode selected in step i) (R=1, unperforated iron sheet perforated, geometric surface of 500 cm²), wherein I/V is as selected in step 1), i.e. 0.6 A/L, and wherein the anode is as selected in step n) (33.3% inert surface).

Step p):

Since the water sample before being subjected to the treatment is devoid of ammonium, the concentration of nitrogen (in mmol/L) over time (min) is measured as ($C_0$—[$NO_3^-$]—[$NH_4^+$]) at each point of time. The straight line obtained for total nitrogen concentration in the y-axis versus time in the x-axis is plotted. $KN_e$ is determined as the slope of this straight line and has a value of 0.023 mM·min⁻¹ in example A and of 0.0086 mM·min⁻¹ in example B.

Step q):

Example A

Figure 2:
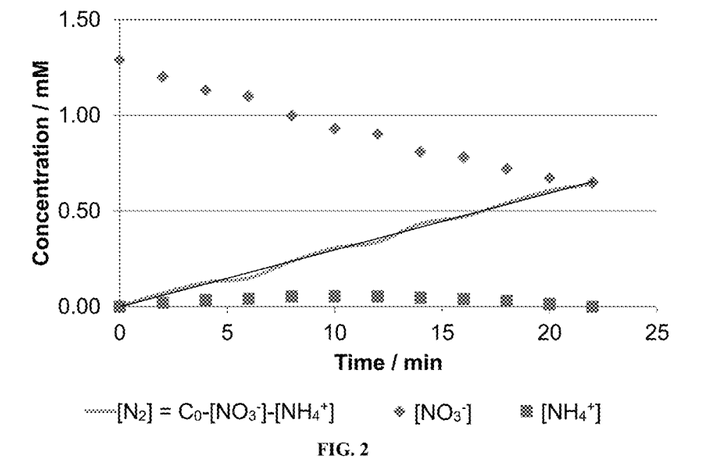
FIG. 2 shows the evolution with time of $NO_3^-$ concentration, $NH_4^+$ concentration and total nitrogen concentration [$N_2$] of Example A.

Treatment of a water sample is repeated (steps n) to p)) selecting an anode having 20% inert surface, the obtained $KN_e$ is 0.0293 mM·min⁻¹ (determined as described in step p), see FIG. 2), which is 1.01·$KN_t$. Thus, the anode having 20% inert surface is selected.

Example B

Figure 3:
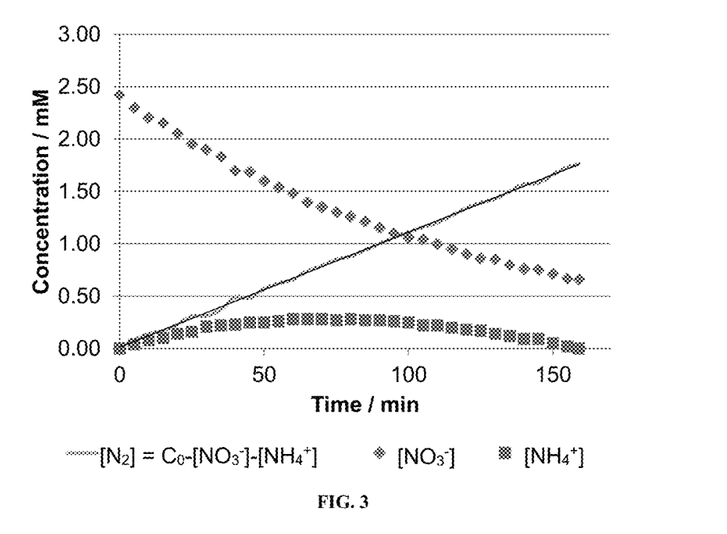
FIG. 3 shows the evolution with time of $NO_3^-$ concentration, $NH_4^+$ concentration and total nitrogen concentration [$N_2$] of Example B.

Treatment of a water sample is repeated (steps n) to p)) selecting an anode having 20% inert surface, the obtained $KN_e$ is 0.0095 mM·min⁻¹ (determined as described in step p), see FIG. 3). The test is repeated but selecting an anode having 25% inert surface, the obtained $KN_e$ is 0.0111 mM·min⁻¹ (determined as described in step p)), which is 1.01·$K_t$. Thus, the anode having 25% inert surface is selected.

Water Electrodenitrification

The water having the ([$NO_3^-$]$_0$=$C_0$) and chlorine ([$Cl^-$]$_0$) concentrations defined in Table 2 were treated in the electrochemical cells defined in Table 3. After the treatment, the water had the nitrate ([$NO_3^-$]$_f$=$C_f$), ammonium ([$NH_4^-$]$_f$) and combined chlorine ([combined chlorine]$_f$) concentrations provided in Table 4.

TABLE 4

|  | Example A | Example B | Comparative example C | Comparative example D |
|---|---|---|---|---|
| [$NO_3^-$]$_f$ = $C_f$ | 40 ppm | 40 ppm | 40 ppm | 40 ppm |
| [$NH_4^+$]$_f$ | <0.50 ppm | <0.50 ppm | <0.5 ppm | 7.4 ppm |
| [combined chlorine]$_f$ | 1 ppm | 0.8 ppm | >3 ppm | <0.2 ppm |

As it can be seen, water treated with the electrochemical cell designed with the method of the present invention (Examples A and B) fulfills the requirements of drinking water, i.e. a nitrate concentration lower than 50 ppm, ammonium concentration lower than 0.5 ppm and combined chlorine concentration lower than 2 ppm, whereas water treated with different electrochemical cells do not achieve these specifications. For example, water obtained after treatment in Comparative example C has a combined chlorine concentration above the threshold established for drinking water of 2 ppm, and water obtained after treatment in Comparative example D has an ammonium concentration above the threshold established for drinking water of 0.5 ppm. As it can be seen, the result of designing an electrochemical cell capable of synchronizing the time to decrease the nitrate concentration $C_0$ to the target value $C_f$ with the time to obtain the target value of ammonium concentration

[NH$_4^+$]$_f$, provides a resulting water having the desired target concentrations of nitrate, ammonium and combined chlorine.

The invention claimed is:

1. A method for designing an electrochemical cell, suitable for reducing the initial nitrate concentration (C$_0$) of a first aqueous solution having a nitrate concentration (C$_0$) greater than 5 ppm and a chloride concentration from 25 ppm to 1500 ppm to yield a second aqueous solution having a final nitrate concentration (C$_f$) lower than 100 ppm, an ammonium concentration [NH$_4^+$]$_f$ lower than 50 ppm and a combined chlorine concentration lower than 2 ppm, wherein the final nitrate concentration (C$_f$) is lower than the initial nitrate concentration (C$_0$), by selecting the volume, the cathode and the anode of said cell as well as selecting the intensity in amperes per volume unit to be applied when operating said cell, said method comprising the steps of:

a) calculating the parameter Z using formula (1):

$$Z = \frac{-\ln(C_f/C_0)}{C_0 - C_f - [NH_4^+]_f} \quad (1)$$

wherein the initial nitrate concentration (C$_0$) of the first aqueous solution, the final nitrate concentration (C$_f$) and the final ammonium concentration ([NH$_4^+$]$_f$) of the second aqueous solution are expressed in mmol/liter;

b) fixing the production (P) in liters/minute of the electrochemical cell, defined as the volume per minute of first aqueous solution that it is desired that the cell is capable of treating;

c) calculating the volume of the electrochemical cell (V$_R$) in liters as from 10 to 180 times the production (P);

d) calculating the theoretical constant (K$_t$) of nitrate reduction to ammonium and/or nitrogen using formula (2):

$$K_t = \frac{-\ln(C_f/C_0)}{V_R} \cdot P; \quad (2)$$

wherein the initial nitrate concentration (C$_0$), the final nitrate concentration (C$_f$) are expressed in mmol/liter, the volume of the electrochemical cell (V$_R$) is expressed in liters and the production (P) is expressed in liters/minute;

e) calculating the intensity in amperes per volume unit in liters to be applied between the anode and the cathode (I/V) of the electrochemical cell using formula (3):

$$I/V = \frac{12.87 \cdot (C_0 - C_f) \cdot K_t}{-\ln(C_f/C_0) \cdot 0.25} \quad (3)$$

wherein the initial nitrate concentration (C$_0$), the final nitrate concentration (C$_f$) are expressed in mmol/liter and K$_t$ is as calculated in step d);

f) selecting a cathode having a fractal surface (R) from 1 to 10;

g) treating a sample of the first aqueous solution in a first electrochemical cell equipped with the cathode selected in step f), an anode which is a titanium-ruthenium oxide anode having 50% of inert surface and having a surface equal to the geometric surface of the cathode selected in step f) and having a cell volume (V$_R$') in liters equal to or less than V$_R$, by applying a continuous electrical current having an intensity such that I/V is as obtained in step e);

h) measuring the concentration of nitrate over time during the treatment of step g) and determining the experimental reaction constant (K$_e$) of nitrate reduction to ammonium and/or nitrogen using said measurements;

i) either adjusting the fractal surface of the cathode by repeating steps f) to h), wherein in each repetition the fractal surface (R) of the cathode selected in step f) is varied until the selected cathode provides an experimental value for the reaction constant (K$_e$) of nitrate reduction to ammonium and/or nitrogen which is between 0.95·K$_t$ and 1.05·K$_t$, wherein K$_t$ is the theoretical reaction constant calculated in step d); or selecting the cathode of step f) if the experimental value for the reaction constant (K$_e$) of nitrate reduction to ammonium and/or nitrogen measured in step h) is between 0.95·K$_t$ and 1.05·K$_t$, wherein K$_t$ is the theoretical reaction constant calculated in step d);

j) treating another sample of the first aqueous solution in the electrochemical cell of step g) wherein the cathode is as selected in step i) at an intensity per volume unit (I/V) different from that applied in step g);

k) measuring the concentration of nitrate over time during the treatment of step j) and determining the experimental reaction constant (K$_e$) of nitrate reduction to ammonium and/or nitrogen using said measurements;

l) either adjusting the intensity per volume (I/V) by repeating steps j) to k), wherein in each repetition the intensity per volume (I/V) is modified, until the selected intensity per volume (I/V) provides an experimental value for the reaction constant (K$_e$) of nitrate reduction to ammonium and/or nitrogen which is between 0.99·K$_t$ and 1.01·K$_t$, wherein K$_t$ is the value of theoretical reaction constant calculated in step d);

or selecting the intensity per volume (I/V) of step j) if the experimental value for the reaction constant (K$_e$) of nitrate reduction to ammonium and/or nitrogen measured in step h) is between 0.99·K$_t$ and 1.01·K$_t$, wherein K$_t$ is the theoretical reaction constant calculated in step d);

m) calculating the theoretical reaction constant (KN$_t$) of ammonium oxidation to nitrogen using formula (4):

$$KN_t = K_t/Z \quad (4)$$

wherein Z is as obtained in step a) and K$_t$ is as obtained in step d);

n) selecting an anode having from 0% to 50% of inert surface;

o) treating another sample of the first aqueous solution in the electrochemical cell used in step g), wherein the intensity per volume unit (I/V) is as selected in step l), the cathode is as selected in step i) and the anode is as selected in step n);

p) measuring the concentration of nitrogen over time during the treatment of step o) and determining the experimental reaction constant (KN$_e$) of ammonium oxidation to nitrogen using said measurements; and q) either adjusting the percentage of inert surface of the anode by repeating steps n) to p), wherein in each repetition the percentage of inert surface of the anode selected in step n) is varied until the selected anode provides an experimental value for the reaction constant (KN$_e$) of ammonium oxidation to nitrogen value which is between $0.98 \cdot KN_t$ and $1.02 \cdot KN_t$, wherein $KN_t$ is the value of the theoretical reaction constant calculated in step m);

or selecting the anode of step n) if the experimental value for the reaction constant $(KN_e)$ of ammonium oxidation to nitrogen measured in step p) is between $0.98 \cdot KN_t$ and $1.02 \cdot KN_t$, wherein $KN_t$ is the theoretical reaction constant calculated in step m);

whereby the volume ($V_R$) of the electrochemical cell is the one calculated in step c), the intensity per volume (I/V) to be applied between the anode and the cathode when operating the cell is the one adjusted or selected in step l), the cathode is chosen to have a fractal surface (R) value as adjusted or selected in step i), the anode is selected to have a percentage of inert surface as adjusted or selected in step q), and the geometric surface ratio between said anode and said cathode has the same value as the geometric surface ratio between the anode of step i) and the cathode of step n).

2. The method according to claim 1, wherein the cathode of step f) has a fractal surface (R) from 1 to 3.

3. The method according to claim 1, wherein the cathode of step f) has a fractal surface (R) selected from the group consisting of 1, 1.2, 1.4 and 1.6.

4. The method according to claim 1, wherein the cathode comprises a metal selected from the group consisting of iron, steel, galvanized iron, galvanized steel, galvanized aluminum, galvanized tin and galvanized nickel.

5. The method according to claim 4, wherein the cathode is selected from the group consisting of a sheet, a perforated sheet, a mesh, a porous sheet, and a sheet comprising microparticles or nanoparticles thereon.

6. The method according to claim 1, wherein the anode selected in step n) has an inert surface selected from the group consisting of 0%, 10%, 20%, 25%, 33% and 50%.

7. The method according to claim 6, wherein the anode is a sheet or a mesh.

8. The method according to claim 1, wherein the anode selected in step n) comprises titanium which is partially or totally coated with a material selected from the group consisting of ruthenium oxide, iridium oxide, platinum oxide and mixtures thereof.

9. The method according to claim 1, wherein the inert surface of the anode comprises a material selected from the group consisting of titanium, platinized titanium, aluminum, anodized aluminum, graphite and mixtures thereof.

10. A process for removing nitrate ions from an aqueous solution comprising:

I) providing an aqueous solution having a nitrate concentration equal to the nitrate concentration ($C_0$) of the first aqueous solution of claim 1 and a chloride concentration equal to the chloride concentration of the first aqueous solution of claim 1, II) providing an electrochemical cell, having a volume of the electrochemical cell ($V_R$), a cathode and an anode equal to those obtained according to the method as defined in claim 1, III) treating the aqueous solution of step a) in the electrochemical cell of step b) applying an intensity per volume unit (I/V) between said anode and said cathode, wherein the value of said intensity per volume unit (I/V) is equal to that obtained according to the method as defined in claim 1;

whereby the resulting aqueous solution has a nitrate concentration ($C_f$) lower than the initial nitrate concentration ($C_0$) with the proviso that $C_f$ is also lower than 100 ppm, an ammonium concentration $[NH_4+]_f$ lower than 50 ppm and a combined chlorine concentration lower than 2 ppm.

11. The process according to claim 10, wherein the concentration of nitrate ions in the aqueous solution ($C_0$) provided in step I) is greater than 125 ppm or lower than 100 ppm.

12. The process according to claim 10, wherein the concentration of nitrate ions in the aqueous solution ($C_0$) provided in step I) is lower than 100 ppm.

13. The process according to claim 10, wherein the ammonium concentration $[NH_4+]_f$ in the resulting aqueous solution is lower than 0.5 ppm.

14. The process according to claim 10, which comprises adding chloride ions to the aqueous solution before step I) whereby the resulting aqueous solution has a chloride concentration from 25 ppm to 1500 ppm.

15. The process according to claim 10, wherein the aqueous solution provided in step I) is selected from the group consisting of ground water, domestic waste water, stagnant water and industrial waste water.

* * * * *